US008572486B2

(12) United States Patent
Yach

(10) Patent No.: US 8,572,486 B2
(45) Date of Patent: Oct. 29, 2013

(54) SYSTEM AND METHOD FOR INTEGRATED PRESENTATION OF INFORMATION

(75) Inventor: David Yach, Waterloo (CA)

(73) Assignee: Blackberry Limited, Waterloo (CA)

( * ) Notice: Subject to any disclaimer, the term of this patent is extended or adjusted under 35 U.S.C. 154(b) by 819 days.

(21) Appl. No.: 11/745,030

(22) Filed: May 7, 2007

(65) Prior Publication Data

US 2007/0271376 A1 Nov. 22, 2007

Related U.S. Application Data

(60) Provisional application No. 60/747,326, filed on May 16, 2006.

(51) Int. Cl.
*G06F 3/00* (2006.01)

(52) U.S. Cl.
USPC ........... 715/703; 715/203; 715/751; 715/752; 715/775; 715/963; 455/566

(58) Field of Classification Search
USPC .................................. 715/963, 703; 455/566
See application file for complete search history.

(56) References Cited

U.S. PATENT DOCUMENTS

| | | | | |
|---|---|---|---|---|
| 5,873,108 | A * | 2/1999 | Goyal et al. .................. | 715/203 |
| 5,890,905 | A * | 4/1999 | Bergman ...................... | 434/118 |
| 6,016,478 | A | 1/2000 | Zhang et al. | |
| 6,163,274 | A | 12/2000 | Lindgren | |
| 6,370,566 | B2 | 4/2002 | Discolo et al. | |
| 6,621,508 | B1 * | 9/2003 | Shiraishi et al. .............. | 715/810 |
| 6,892,346 | B1 * | 5/2005 | Lamb et al. .................... | 715/203 |
| 7,134,089 | B2 * | 11/2006 | Celik et al. .................... | 715/767 |
| 7,283,808 | B2 * | 10/2007 | Castell et al. ................. | 455/413 |
| 7,353,465 | B2 * | 4/2008 | Callaway et al. ............. | 705/7.13 |
| 7,992,096 | B1 * | 8/2011 | Davis ............................ | 715/781 |
| 2003/0013483 | A1 * | 1/2003 | Ausems et al. ............... | 455/556 |
| 2003/0097361 | A1 * | 5/2003 | Huang et al. .................... | 707/10 |
| 2004/0121823 | A1 | 6/2004 | Noesgaard et al. | |
| 2004/0155908 | A1 * | 8/2004 | Wagner ........................ | 345/854 |
| 2004/0192270 | A1 | 9/2004 | Kreitzer | |
| 2006/0101350 | A1 * | 5/2006 | Scott ............................. | 715/779 |
| 2006/0270461 | A1 * | 11/2006 | Won et al. .................... | 455/566 |
| 2007/0232277 | A1 * | 10/2007 | Spalink ..................... | 455/414.1 |

OTHER PUBLICATIONS

CRT Systems, Inc., "V/BOSS Operator's Guide", Oct. 19, 2004.*
International Search Report issued by the Canadian Intellectual Property Office dated Sep. 5, 2007 for corresponding International Application No. PCT/CA2007/000804 filed May 7, 2007.
Written Opinion of the International Searching Authority issued by the Canadian Intellectual Property Office dated Sep. 5, 2007 for corresponding International Application No. PCT/CA2007/000804 filed May 7, 2007.
Extended European Search Report issued by the European Patent Office dated Dec. 30, 2008 for corresponding European Patent Application 07719728.3.
Office Action issued by the Canadian Intellectual Property Office dated Dec. 12, 2008 for corresponding Canadian Patent Application No. 2618606.

* cited by examiner

*Primary Examiner* — Alvin Tan
(74) *Attorney, Agent, or Firm* — Gowling Lafleur Henderson LLP

(57) ABSTRACT

There is provided a method and system to present event information to a user of an electronic messaging and organizing system. An integrated list of individual events is defined to include message-related events (e.g. email, SMS, phone logs, etc.) and time-organization-related events (future or current appointments, alarms). The integrated list is displayed in a graphical user interface on a display of an electronic device to provide a snapshot of the user's activities.

20 Claims, 7 Drawing Sheets

SYSTEM AND METHOD FOR INTEGRATED PRESENTATION OF INFORMATION

CROSS REFERENCE

This application claims the benefit of U.S. Provisional Patent Application No. 60/747,326 filed May 16, 2006, which is incorporated herein by reference.

FIELD

The present application relates to the presentation of information to the user of an electronic communications device, in particular, to the presentation of message, calendar and other event information.

BACKGROUND

For communication and personal organization needs, individuals often turn to electronic devices such as personal computers and, particularly, handheld electronic devices (e.g. mobile telephones, personal digital assistants (PDAs), etc.) that provide data and, optionally, voice communication capabilities as well as calendar and alarm functions to organize appointments and the like.

Messages such as email, voicemail, call logs and other message events are presented to the user via a graphical user interface (GUI) in a unified list such as a message list or Inbox. The message list may be navigated to, among other things, view and/or listen to messages, delete messages and compose messages including reply messages, forward messages or other new messages. Such a message list maintains a history of past events, namely received and sent messages.

In contrast, appointments, alarms etc. are presented in separate interfaces. A calendar of appointments for a day, week, etc. may be viewed and navigated to add, delete, and update appointments, etc. However, users must switch between calendar and message list views to see a picture of the user's day that shows recent messages and upcoming appointments.

Some user interfaces attempt to show a user's day (or days) at a glance in a single view. While such a view may show upcoming appointments and a count of recently received messages, the user must switch views to see particular message information.

A solution that addresses one or more of these issues is therefore desired.

BRIEF DESCRIPTION OF THE DRAWINGS

In order that the subject matter may be readily understood, embodiments are illustrated by way of examples in the accompanying drawings, in which.

DETAILED DESCRIPTION

Figure 1:
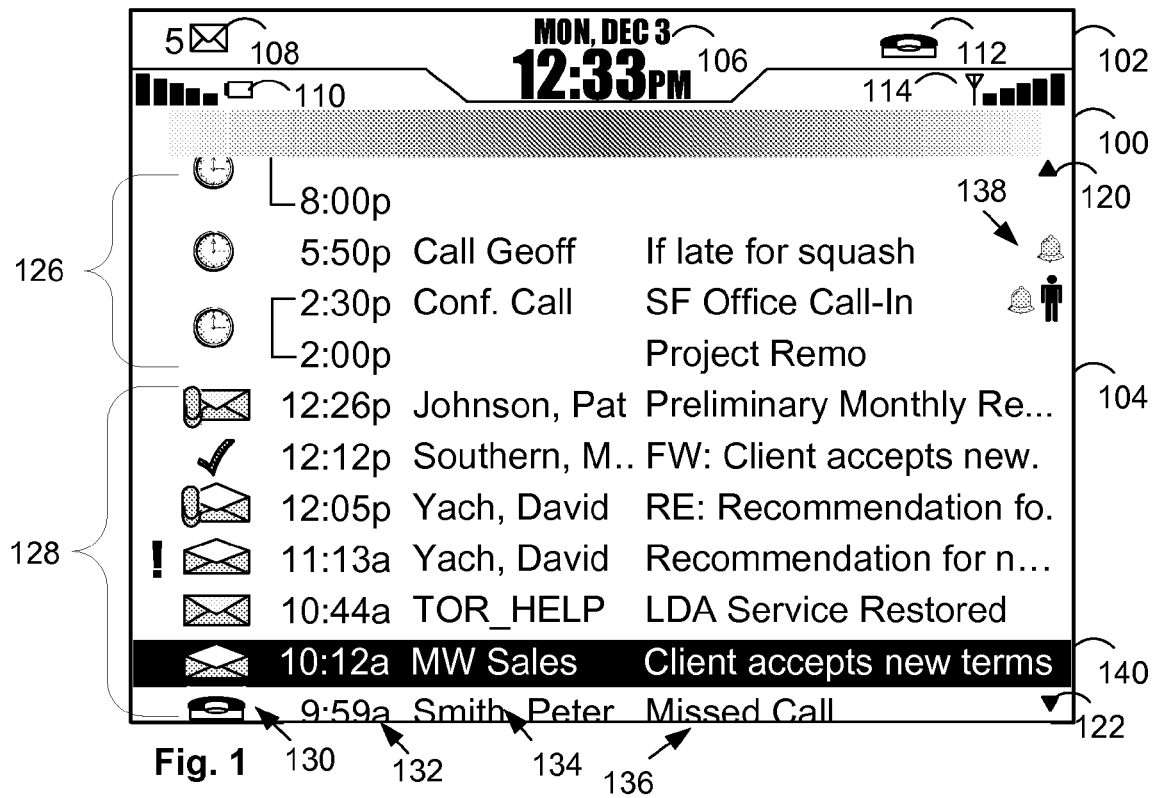
FIGS. 1-6 are example screen views of an integrated presentation GUI in accordance with an embodiment.

There is provided a method and system to present event information to a user of an electronic messaging and organizing system. An integrated list of individual events is defined to include message-related events (e.g. email, SMS, phone logs, etc.) and time-organization-related events (future or current appointments, alarms). The integrated list is displayed in a graphical user interface on a display of an electronic device to provide a snapshot of the user's activities.

In one aspect a method of providing a user interface presenting information to a user of an electronic messaging and organizing system comprises:

defining an integrated list of individual events for the user, wherein said integrated list of individual events comprises summary information for each individual event and wherein each individual event comprises one of a message-related event or a time-organization-related event; and displaying said list of individual events in a graphical user interface on a display of an electronic device in accordance with respective times of occurrence of said events to provide a snapshot the user's activities.

In another aspect an electronic messaging and time-organizing system comprises a communications interface for communicating electronic messages; and a processor and a memory storing instructions and data to configure the processor to communicate messages via a messaging application and organize appointments via a calendar application and provide a user interface, said interface defining an integrated list of individual events for the user comprising summary information for each individual event and wherein each individual event comprises one of a message-related event or a time-organization-related event; and displaying said list of individual events in a graphical user interface on a display of an electronic device in accordance with respective times of occurrence of said events to provide a snapshot of the user's activities.

Computer program product and other aspects will also be apparent those of ordinary skill in the art.

FIGS. 1-6 are example screen views of an integrated presentation GUI displaying calendar and other personal organizational events with message events in accordance with an embodiment.

With reference to FIGS. 1-5, there are illustrated various views 100, 200, 300, 400 and 500 of an integrated list of individual events for displaying and interacting with messages, calendar appointments and alarm events. View 100 comprises two major display portions, namely, status display portion 102 and event list display portion 104. Status display portion 102 is configured to present various status information related to the device generally, the event list application and other applications. The status information of portion 102 comprises day, date and time 106, new email message count 108, battery life 110, phone activity count 112 and signal strength 114. Other status information such as other new message counts (IM, SMS, WAP, etc. as applicable), network identity, roaming status, alarm, etc. may be indicated as is well known to ordinary persons skilled in the art. Status display portion 102 typically does not permit user navigation or interaction with elements of the portion.

Below portion 102 there is event list display portion 104 configured to present integrated information for individual events including message events 128, and future events 126 such as upcoming calendar appointments and alarms in a single list having a common display format to permit a user to get a snapshot of user's activities especially for a current day. Individual events in the list are typically displayed in accordance with a time associated with the event. Message events are typically past events and appear apart from (e.g. below) future events in the embodiment. Other sort and display criteria may be applied (not shown). As will be further illustrated and described, as calendar and alarm events become current, they are removed from the integrated list once completed. These time-organization-related events may be retained within their associated applications (e.g. calendar and alarm) for maintaining a history. A user may navigate a focus (e.g. 140 of FIG. 1 or 210 of FIG. 2) about the list using a pointing or other device (e.g. a thumbwheel, mouse, touch screen device) or keys to highlight a particular list element for action as is well known. Navigation assists 120 and 122 indicate that additional list elements are available for display upon navigation by the user. View 200 of FIG. 2, illustrating only future events may be displayed upon navigating focus 140 up the list of view 100.

In the present embodiment, the common display format for each event in the list comprises icon field 130, time field 132, name field 134, subject field 136 and optional extra icon field 138. Icon field 130 may display one or more icons for the event. The icons typically indicate the type of event (message, alarm, calendar) and associated flags or status (e.g. message or event type, message importance, confidentiality, send/receive status, attachments, draft, etc.) For example, message events 128 illustrate email and telephone events including received and sent email messages (some with attachments), missed call event, etc.

Time field 132 typically shows the time of occurrence of the event on the device. For example, for received messages or other message events (e.g. missed call) it is usually time of receipt. For calendar events, the time field may indicate both a start and a stop time as applicable. Though not shown, a single time may be displayed for a calendar event such as the start time. Focus 210 highlights a stop time for a particular calendar event. Alarm events (e.g. 208) typically have a single associated time of occurrence. The order of display (from left to right) may be different than illustrated and optionally be user configurable. Additional information for different event types may also be shown particularly on display devices having sufficient resolution and screen size. For example, message events may include both sender and recipient information. Calendar events may include location information.

In addition to displaying individual events in the event list, display portion 104 may display a day and date element (e.g. 202, 204 and 206) in the list to divide or group events according to date.

Figure 2:
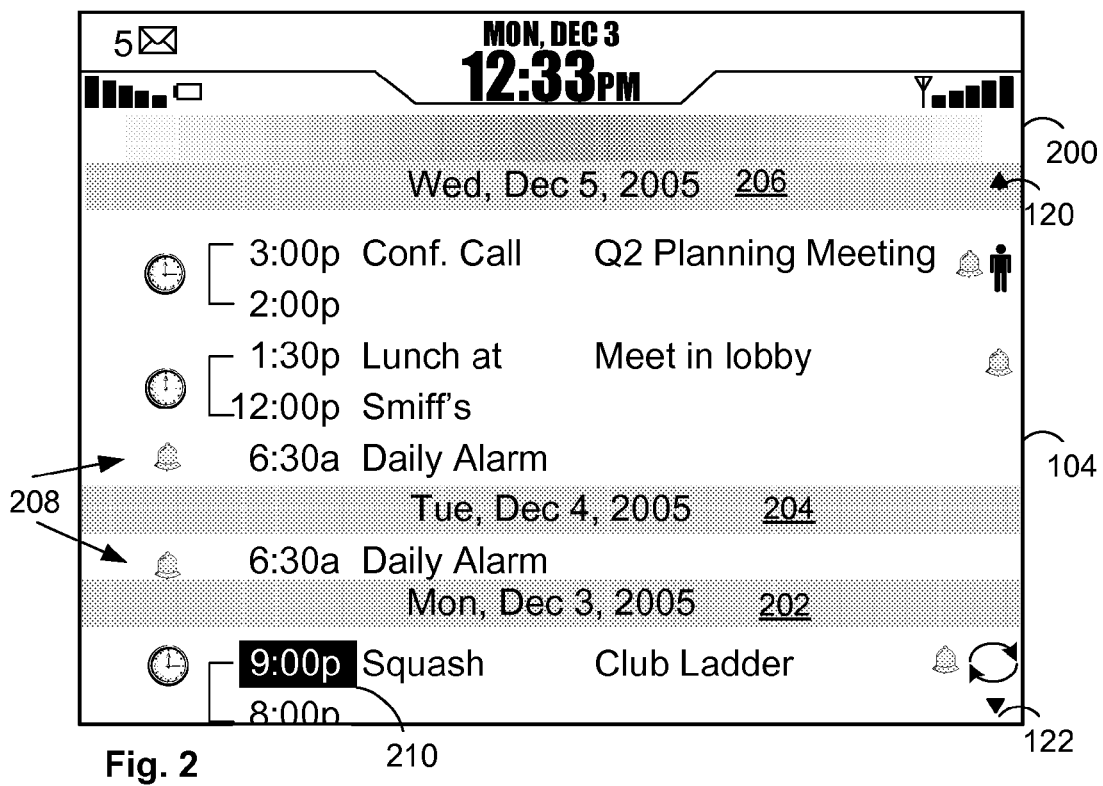
Figure 3:
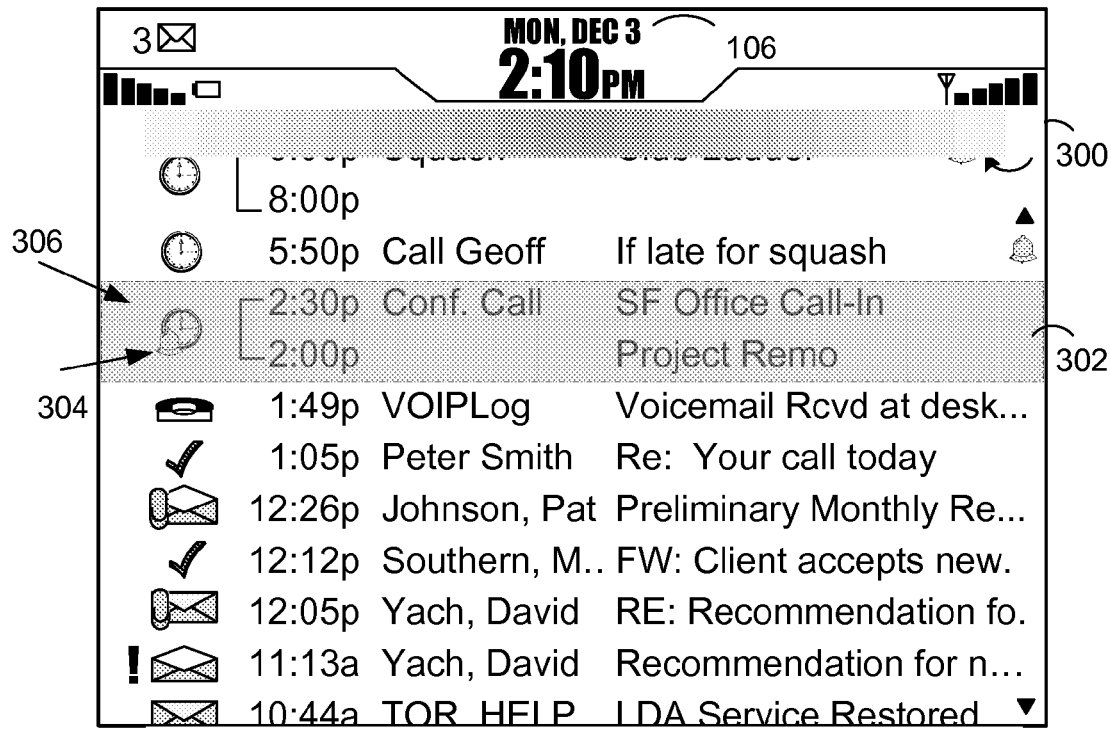
Figure 4:
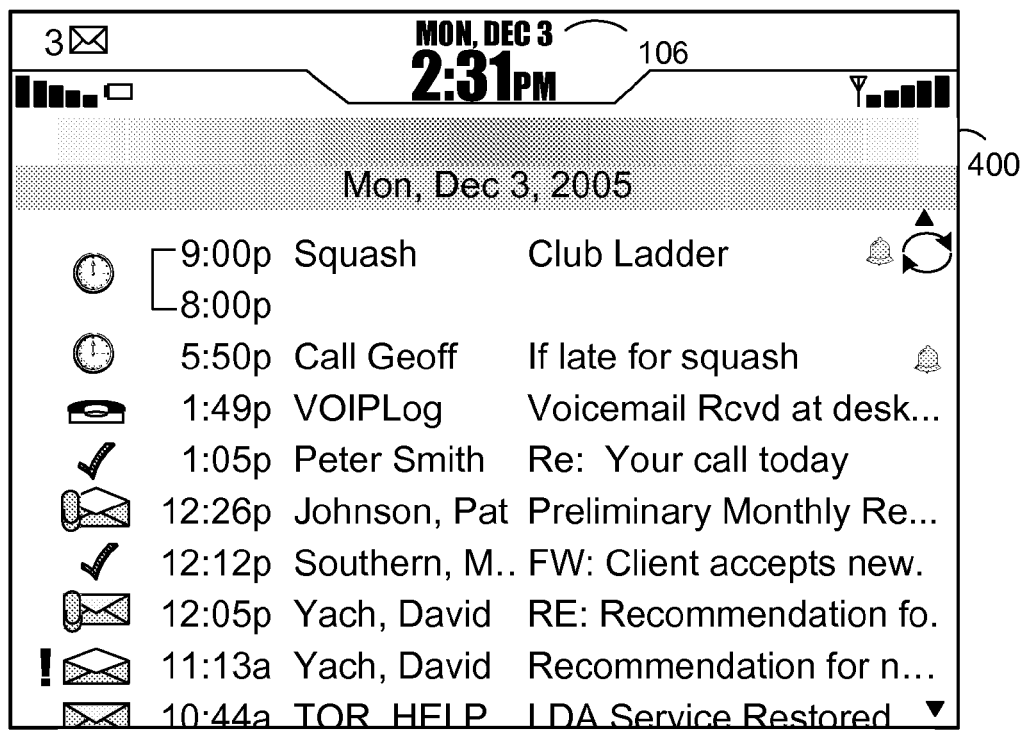

FIGS. 1, 3 and 4 illustrate representative views 100, 300 and 400 of the integrated GUI at different times to show event activity and the treatment of time-organization-related events (i.e. future events 126) in the display portion 104. As future events 126 become current (i.e. its start time occurs), the events may be removed from the list of individual events. FIG. 3 illustrates a calendar event 302 that is current and highlights the currency with a change of icon 304. Currency is further indicated with broken line surround 306. FIG. 4 illustrates view 400 where event 302 is removed from the list after its occurrence. Preferably, the particular future event is maintained in the display list for at least a portion of time after its occurrence. Maintaining an organizational item after its initial occurrence may remind a user of the event should the user be running late. Other reminder mechanisms may also be employed such as sensory cues (e.g. audible or tactile cue) as controlled by the associated application for example. Future events may be maintained until a predetermined period expires, until the event ends (e.g. its stop time is reached), or until the later of these. These may be options configurable by a user. Should a new message event occur during a current event, it may be displayed above or preferably below the current event in the message list.

Figures 5, 6:

FIG. 5 illustrates a view 500, similar to view 200, but showing an example menu-based interface 502. The illustrated menu 502 is itself list-based, showing various options for invoking commands to work with the message list interface, an event (e.g. calendar event 506) and to invoke an associated application, among other options. For purposes of illustration only, a calendar event is used. Menu 502 may be invoked such as by moving the focus 210 and clicking an input device or pressing enter as is well known. One command 504 is an "open" command to open the associated event 506. Upon invoking the open command, further details for the associated event 506 are presented (FIG. 6). View 600 may be presented over all or a portion of view 500. View 600 is typically under the control of the application associated with the event (i.e. the calendar application in this example.) View 600 may be navigable by a user and a focus or cursor 602 moved about the view. Persons of ordinary skill in the art will appreciate that the event 506 may be opened for editing or for viewing (not shown). Closing view 600 will typically re-invoke or return to view 500.

Figure 7:
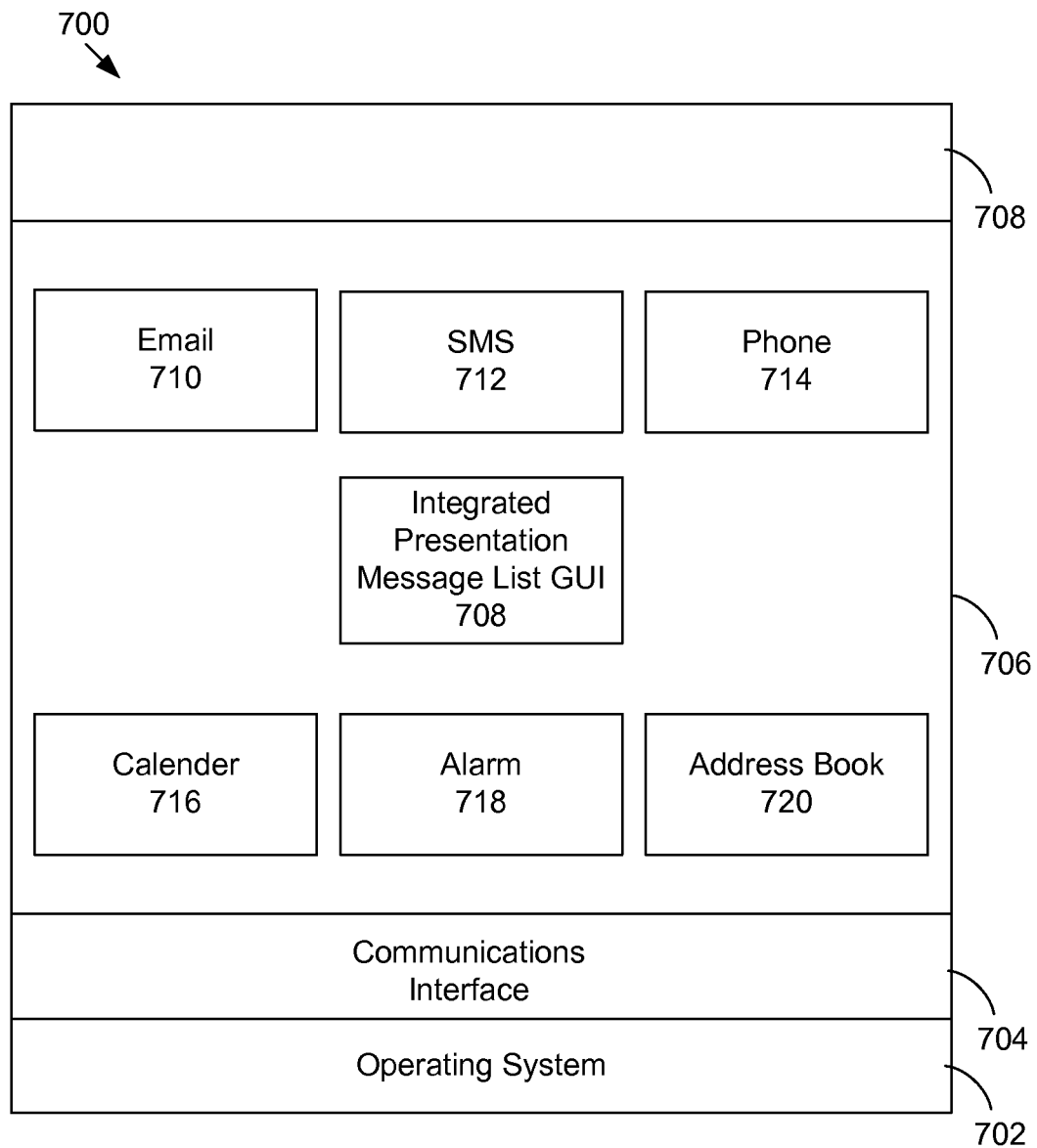
FIG. 7 is a block diagram of a storage device showing software components in accordance with an embodiment.

FIG. 7 is a block diagram of a computer programmable medium such as a memory component 700 of an electronic device (e.g. device 1002 of FIG. 10) illustrating example software components in accordance with an embodiment. Memory 700 stores instructions and data comprising an operating system 702, communications interface 704, applications 706 and other components 708. Applications may comprise various data and/or voice communications applications such as email application 710, SMS application 712 and telephone application 714. Time-oriented organizational applications include calendar application 716 and alarm application 718. Other information organizational applications include address book 720. Persons of ordinary skill in the art will appreciate that the various applications 706 may cooperate with one another and that bright line distinctions between applications may be artificial for purposes of illustration. Coordination may be achieved through a management application providing an integrated GUI such as a personal information manager (PIM) message list interface 708. Interface 708 operates to present the various views 100, 200, 300, 400, 500, and 600 described.

Other components 708 (not individually illustrated) may comprise a calculator, a web browser, media applications (e.g. camera, picture viewer, etc.), games, data synchronization, various user-profile functions and options, etc. PIM 708 may also be configured to work with these other components 708. Though not shown, various applications are coupled to persistent stores for persisting data such as messages, calendar items, pictures, etc. as applicable.

Figure 8:
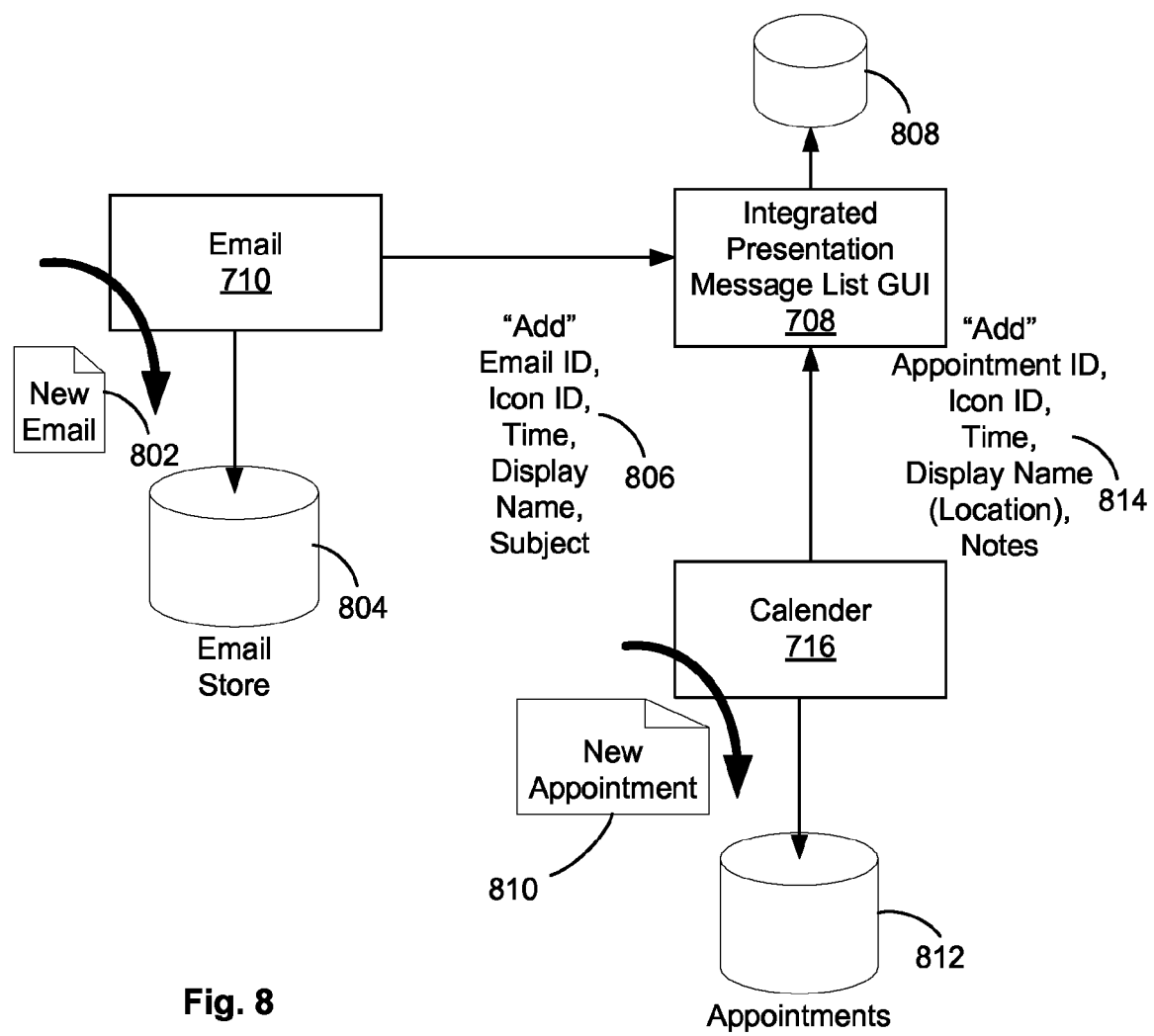
FIG. 8 is a block diagram showing an example interaction between selected software components of FIG. 7 in accordance with an embodiment.

FIG. 8 is a block diagram showing an example interaction between selected software components of FIG. 7 in accordance with an embodiment. In the illustrated embodiment, message applications such as email application 710 persist email data and provide the integrated event list GUI 708 with a subset of email data including information summarizing the event for display as an event in the list. Organizational event applications such as calendar application 716 persist appointment events and provide a subset of such data including information summarizing the event for display as an event by the integrated presentation event list GUI 708 as well. A protocol may be defined to exchange data and data operations between the primary event applications (e.g. 710 and 716) and the GUI 708 so that, among other operations, new events may be added and expired events deleted. Alternatively, the applications (710, 716 and/or 708) may provide APIs to obtain/receive the required data to define the event of the event list. A person of ordinary skill in the art will recognize how to program such an interface.

With reference to FIG. 8, a new email 802 is received via email application 710 and persisted to email store 804. Email application 710 provides sufficient data 806 to GUI 708, including summary information in accordance with the common display format, to add a message event to the list for display in portion 104. GUI 708 may persist this data to its store 808 and/or maintain same in memory 702 (not shown). Such data 806 may include an email ID to identify the specific email in the email store. Should a user wish to work with the associated email (e.g. open, reply, delete, forward etc.) from the GUI 708 the email ID may be provided back to the email application 710 to facilitate such interaction (not shown). Similar activities may occur for a new email composed via application 710 or to changes to an email (e.g. change of state from sending to sent).

As well, FIG. 8 also shows a new appointment 810 received via calendar application 716 and persisted to store 812. New appointment 810 may be defined via a user interface of application 716 or received via a data message (e.g. like an email) invitation or as a result of synchronization between application 716 and a remote associated calendar application (not shown). For example, associated calendar applications may reside respectively on an enterprise computer and a portable device (PDA). Calendar application 716 provides sufficient data 814 to GUI 708, including summary information in accordance with the common display format, to add the appointment event to the list for display in portion 104. Again this data 814 may be persisted as necessary to store 808 or stored in memory 702. Similarly an appointment ID may be provided to facilitate working with the appointment and similar activities may occur for updated or deleted appointments.

As noted above, message-related events are generally maintained as a log of events in the display list of GUI 708 while time-organization-related events such as appointments and alarms are removed upon expiry of a predetermined period after their respective start times of occurrence. In accordance with a mechanism for exchanging data between the event applications and the GUI 708, a time-organization-related application might be configured to provide a delete operation, as necessary, to remove an event from the display list. Alternatively, the GUI 708 may be adapted to periodically poll the various applications for data to be displayed and to only display organizational events that have not completed or otherwise expired as described.

Figure 9:
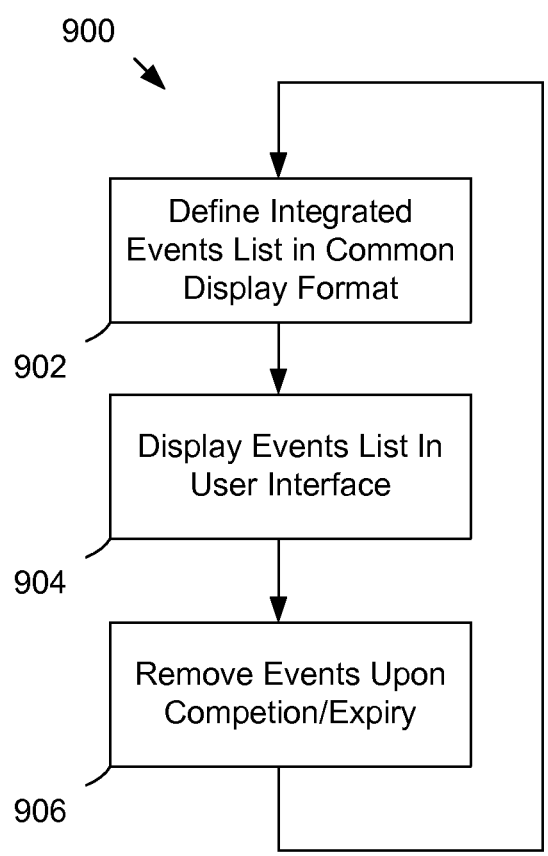
FIG. 9 is a flowchart of operations, in accordance with an embodiment, for the integrated presentation of information in a message list.

FIG. 9 is a flowchart of operations, in accordance with an embodiment, for the integrated presentation of information in an event list GUI. At step 902, a list of individual events is defined in a common format including summary information from events such as message activities and future time-oriented organizational events. At step 904, the event list is displayed in a graphical user interface. The action of displaying may be responsive to user input, such as an invocation of the event list display GUI application. At step 906, as future time-organization-related events occur, as described above, they are removed from display in the event list to maintain a snapshot of the user's activities for the day. Operations 900 may repeat, particularly to maintain the list of individual events. Persons of ordinary skill in the art will appreciate that operations 900 are simplified. Operations 900 account for new event activity such as new message event occurrences, new time-organization-related events and the occurrence of time-organization-related events, event deletions, etc. whether such activities are occasioned automatically, through data messaging, or in response to user input such as described previously.

Figure 10:
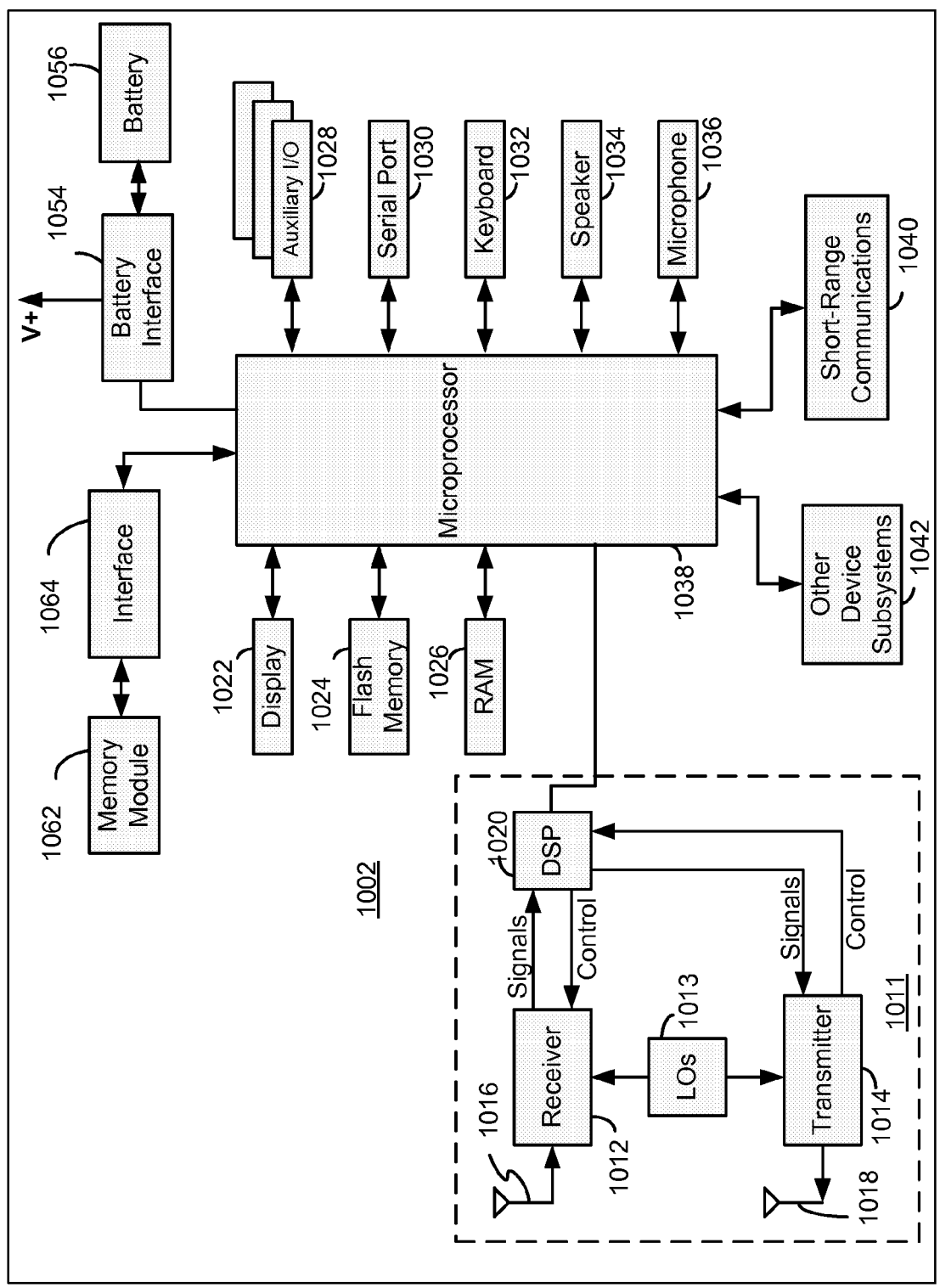
FIG. 10 is an example of a handheld device adapted in accordance with an embodiment.

FIG. 10 is a detailed block diagram of a preferred handheld device 1002 adapted in accordance with an embodiment that may be used as an electronic device having message and organization system functions. Handheld device 1002 is preferably a two-way communication device having at least voice and advanced data communication capabilities, including the capability to communicate with other computer systems. Depending on the functionality provided by handheld device 1002, it may be referred to as a data messaging device, a two-way pager, a cellular telephone with data messaging capabilities, a wireless Internet appliance, or a data communication device (with or without telephony capabilities). Handheld device 1002 may communicate with any one of a plurality of base station transceiver systems (not shown) within its geographic coverage area.

Handheld device 1002 will normally incorporate a communication subsystem 1011, which includes a receiver 1012, a transmitter 1014, and associated components, such as one or more (preferably embedded or internal) antenna elements 1016 and 1018, local oscillators (LOs) 1013, and a processing module such as a digital signal processor (DSP) 1020. As will be apparent to those skilled in field of communications, particular design of communication subsystem 1011 depends on the communication network in which handheld device 1002 is intended to operate.

Handheld device 1002 may send and receive communication signals over the network after required network registration or activation procedures have been completed. Signals received by antenna 1016 through the network are input to receiver 1012, which may perform such common receiver functions as signal amplification, frequency down conversion, filtering, channel selection, and like, and in example shown in FIG. 10, analog-to-digital (A/D) conversion. A/D conversion of a received signal allows more complex communication functions such as demodulation and decoding to be performed in DSP 1020. In a similar manner, signals to be transmitted are processed, including modulation and encoding, for example, by DSP 1020. These DSP-processed signals are input to transmitter 1014 for digital-to-analog (D/A) conversion, frequency up conversion, filtering, amplification and transmission over communication network via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

Network access is associated with a subscriber or user of handheld device 1002, and therefore handheld device 1002 comprises a memory module 1062, such as a Subscriber Identity Module card or a Removable User Identity Module (R-UIM), to be inserted in or connected to an interface 1064 in order to operate in the network. Alternatively, memory module 1062 may be a nonvolatile memory that is programmed with configuration data by a service provider so that mobile station 1002 may operate in the network. Since handheld device 1002 is a mobile battery-powered device, it also includes a battery interface 1054 for receiving one or more rechargeable batteries 1056. Such a battery 1056 provides electrical power to most if not all electrical circuitry in handheld device 1002, and battery interface 1054 provides for a mechanical and electrical connection for it. The battery interface 1054 is coupled to a regulator (not shown in FIG. 5) that provides power V+ to all of the circuitry.

Handheld device 1002 includes a microprocessor 1038 that controls overall operation of mobile station 1002. Communication functions, including at least data and voice communications, are performed through communication subsystem 1011. Microprocessor 1038 also interacts with additional device subsystems such as a display 1022, a flash memory 1024, a random access memory (RAM) 1026, auxiliary input/output (I/O) subsystems 1028, a serial port 1030, a keyboard 1032, a speaker 1034, a microphone 1036, a short-range communications subsystem 1040, and any other device subsystems generally designated at 1042. Some of the subsystems shown in FIG. 5 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list. Operating system software used by microprocessor 1038 is preferably stored in a persistent store such as flash memory 1024, which may alternatively be a read-only memory (ROM) or similar storage element (not shown). Those skilled in the art will appreciate that the operating system, specific device applications, or parts thereof, may be temporarily loaded into a volatile store such as RAM 1026.

Microprocessor 1038, in addition to its operating system functions, preferably enables execution of software applications on handheld device 1002. A predetermined set of applications that control basic device operations, including at least data and voice communication applications, will normally be installed on handheld device 1002 during its manufacture. A preferred application that may be loaded onto handheld device 1002 may be a personal information manager (PIM) application having the ability to organize and manage data items relating to a user such as, but not limited to, e-mail, calendar events, voice mails, appointments, and task items. Naturally, one or more memory stores are available on handheld device 1002 and memory module 1062 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on handheld device 1002 with respect to such items. This is especially advantageous where the host computer system is the mobile station user's office or enterprise computer system. Additional applications may also be loaded onto handheld device 1002 through network, an auxiliary I/O subsystem 1028, serial port 1030, short-range communications subsystem 1040, or any other suitable subsystem 1042, and installed by a user in RAM 1026 or preferably a nonvolatile store (not shown) for execution by microprocessor 1038. Such flexibility in application installation increases the functionality of handheld device 1002 and may provide enhanced on-device functions, communication-related functions, or both. For example, secure communication applications may enable electronic commerce functions and other such financial transactions to be performed using handheld device 1002.

In a data communication mode, a received signal such as a text message, an e-mail message, or web page download will be processed by communication subsystem 1011 and input to microprocessor 1038. Microprocessor 238 will preferably further process the signal for output to display 1022 or alternatively to auxiliary I/O device 1028. A user of handheld device 1002 may also compose data items, such as e-mail messages, for example, using keyboard 1032 in conjunction with display 1022 and possibly auxiliary I/O device 1028. Keyboard 1032 is preferably a complete alphanumeric keyboard and/or telephone-type keypad. These composed items may be transmitted over a communication network through communication subsystem 1011.

For voice communications, the overall operation of handheld device 1002 is substantially similar, except that the received signals would be output to speaker 1034 and signals for transmission would be generated by microphone 1036. Alternative voice or audio I/O subsystems, such as a voice message recording subsystem, may also be implemented. Although voice or audio signal output is preferably accomplished primarily through speaker 1034, display 1022 may also be used to provide an indication of the identity of a calling party, duration of a voice call, or other voice call related information, as some examples.

Serial port 1030 in FIG. 10 is normally implemented in a personal digital assistant (PDA)-type communication device for which synchronization with a user's desktop computer as a desirable, albeit optional, component. Serial port 1030 enables a user to set preferences through an external device or software application and extends the capabilities of handheld device 1002 by providing for information or software downloads to handheld device 1002 other than through a wireless communication network. The alternate download path may, for example, be used to load an encryption key onto handheld device 1002 through a direct and thus reliable and trusted connection to thereby provide secure device communication.

Short-range communications subsystem 1040 is an additional optional component that provides for communication between handheld device 1002 and different systems or devices, which need not necessarily be similar devices. For example, subsystem 1040 may include an infrared device and associated circuits and components, or a Bluetooth™ communication module to provide for communication with similarly enabled systems and devices. Bluetooth™ is a registered trademark of Bluetooth SIG, Inc.

Handheld device 1002 may be configured such as via software (instructions and data) to provide the integrated presentation of information in a GUI as described above.

In addition to the embodiments illustrated in FIGS. 7, 8 and 9, the integration presentation GUI may operate on a client/server model as is well known. The GUI may be configured as a client and the applicable event applications be configured (primarily) for execution on a server. The GUI may be a "thin client" and/or Web browser-based.

Although embodiments of the invention have been described herein, it will be understood by those skilled in the art that variations may be made thereto without departing from the spirit of the invention or the scope of the appended claims.

What is claimed is:

1. A method of providing a user interface presenting information at an electronic messaging and organizing system, said method comprising:

defining an integrated list of individual events that includes summary information for each individual event and wherein each individual event comprises one of a message-related event and a time-organization-related event;

presenting said list of individual events in a graphical user interface display view of an electronic device, the view including a status display portion and an event list portion that shows past message-related events apart from time-organization-related events, wherein a time-organization-related event in the future or past is shown with a start time, an end time and an indication of a duration associated with the start and end times;

visually indicating, within the event list portion, when a particular time-organization-related event in the future becomes current;

providing options for a user to configure removal from said list of the particular time-organization-related event, the options comprising (a) the particular time-organization-related event's end time, (b) a predefined time period after the time-organization-related event's end time, and (c) the later of (a) and (b);

detecting selection of one of the provided options;

removing the particular time-organization-related event from said list after the visually indicating and in accordance with the selected option;

providing, at least partially over the display view, an option of commands invoking an application associated with a selected event from the list of individual events; and in response to invoking the application associated with the selected event, displaying a detail view of the selected event, the detail view being navigable to edit the selected event.

2. The method according to claim 1 comprising maintaining the integrated list of individual events in accordance with new event activity.

3. The method according to claim 1 wherein the summary information for each event is presented in a common display format.

4. The method according to claim 1 comprising obtaining the summary information for each event from an application associated with the event.

5. The method of claim 1 wherein the indication of a duration associated with the start and end times comprises a bracket that extends between a line of the list on which the start time is shown and another line of the list on which the end time is shown.

6. The method according to claim 1 wherein the visually indicating when the particular time-organization-related event in the future becomes current includes changing an icon associated with the particular time-organization-related event.

7. The method according to claim 1 wherein the visually indicating when the particular time-organization-related event in the future becomes current includes surrounding the particular time-organization-related event with a broken line.

8. An electronic messaging and time-organizing system, said system comprising:

a communications interface for communicating electronic messages; and a processor and a memory storing instructions and data to configure the processor to:

communicate messages via a messaging application;

organize appointments via a calendar application; and provide a user interface presenting message and appointment information to provide a snapshot of activities, said processor configured to:

define an integrated list of individual events that includes summary information for each individual event and wherein each individual event comprises one of a message-related event and a time-organization-related event;

present said list of individual events in a graphical user interface display view of an electronic device, the view including a status display portion and an event list portion that shows past message-related events apart from time-organization-related events, wherein a time-organization-related event in the future or past is shown with a start time, an end time and an indication of a duration associated with the start and end times;

visually indicate, within the event list portion, when a particular time-organization-related event in the future becomes current;

provide options for a user to configure removal from said list of the particular time-organization-related event, the options comprising (a) the particular time-organization-related event's end time, (b) a predefined time period after the particular time-organization-related event's end time, and (c) the later of (a) and (b);

detect selection of one of the provided options;

remove the particular time-organization-related event from said list after the visually indicating and in accordance with the selected option;

provide, at least partially over the display view, an option of commands invoking an application associated with a selected event from the list of individual events; and in response to invoking the application associated with the selected event, display a detail view of the selected event, the detail view being navigable to edit the selected event.

9. The system according to claim 8 wherein the processor is configured to maintain the integrated list of individual events in accordance with new event activity.

10. The system according to claim 8 wherein the processor is configured to present the summary information for each event in a common display format.

11. The system according to claim 8 wherein the processor is configured to obtain the summary information for each event from an application associated with the event.

12. The system according to claim 8 wherein the indication of a duration associated with the start and end times comprises a bracket that extends between a line of the list on which the start time is shown and another line of the list on which the end time is shown.

13. The system according to claim 8 wherein the processor is configured to visually indicate when the particular time-organization-related event in the future becomes current by changing an icon associated with the particular time-organization-related event.

14. The system according to claim 8 wherein the processor is configured to visually indicate when the particular time-organization-related event in the future becomes current by surrounding the particular time-organization-related event with a broken line.

15. A computer program product having computer readable code stored in a non-transitory computer readable storage medium for execution by a processor of an electronic messaging and organizing system to present message and appointment information to provide a snapshot of activities, said code configuring a processor to:

define an integrated list of individual events that includes summary information for each individual event and wherein each individual event comprises one of a message-related event and a time-organization-related event;

present said list of individual events in a graphical user interface display view of an electronic device, the view including a status display portion and an event list portion that shows past message-related events apart from time-organization-related events, wherein time-organization-related event in the future of past is shown with a start time, an end time and an indication of a duration associated with the start and end times;

visually indicate, within the event list portion, when a particular time-organization-related event in the future becomes current;

provide options for a user to configure removal from said list of the particular time-organization-related event, the options comprising (a) the particular time-organization-related event's end time, (b) a predefined time period after the particular time-organization-related event's end time, and (c) the later of (a) and (b);

detect selection of one of the provided options;

remove the particular time-organization-related event from said list after the visually indicating and in accordance with the selected option;

provide, at least partially over the display view, an option of commands invoking an application associated with a selected event from the list of individual events; and in response to invoking the application associated with the selected event, display a detail view of the selected event, the detail view being navigable to edit the selected event.

16. The computer program product according to claim 15, wherein the processor is configured to maintain the integrated list of individual events in accordance with new event activity.

17. The computer program product according to claim 15 wherein the processor is configured to present the summary information for each event in a common display format.

18. The computer program product according to claim 15 wherein the processor is configured to obtain the summary information for each event from an application associated with the event.

19. The computer program product according to claim 15 wherein the processor is configured to visually indicate when the particular time-organization-related event in the future becomes current by changing an icon associated with the particular time-organization-related event.

20. The computer program product according to claim 15 wherein the processor is configured to visually indicate when the particular time-organization-related event in the future becomes current by surrounding the particular time-organization-related event with a broken line.

* * * * *